United States Patent
Berkenkamp et al.

(10) Patent No.: US 12,194,631 B2
(45) Date of Patent: Jan. 14, 2025

(54) DEVICE AND METHOD FOR CONTROLLING A PHYSICAL SYSTEM

(71) Applicant: Robert Bosch GmbH, Stuttgart (DE)

(72) Inventors: Felix Berkenkamp, Stuttgart (DE); Jonathan Spitz, Leonberg (DE); Kathrin Skubch, Frankfurt (DE); Lukas Grossberger, Leonberg (DE); Stefan Falkner, Renningen (DE); Anna Eivazi, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 410 days.

(21) Appl. No.: 17/446,234

(22) Filed: Aug. 27, 2021

(65) Prior Publication Data
US 2022/0097227 A1  Mar. 31, 2022

(30) Foreign Application Priority Data
Sep. 25, 2020  (DE) .......................... 102020212076.5

(51) Int. Cl.
*B25J 9/16* (2006.01)
*G06F 18/2415* (2023.01)
*G06N 20/00* (2019.01)

(52) U.S. Cl.
CPC .............. *B25J 9/161* (2013.01); *B25J 9/163* (2013.01); *B25J 9/1661* (2013.01); *G06F 18/24155* (2023.01); *G06N 20/00* (2019.01)

(58) Field of Classification Search
CPC .......... B25J 9/161; B25J 9/163; B25J 9/1661; G06F 18/24155; G06N 20/00;
(Continued)

(56) References Cited

U.S. PATENT DOCUMENTS

| | | | | |
|---|---|---|---|---|
| 11,640,562 B1* | 5/2023 | Badithela | ................. | G06N 7/01 706/12 |
| 2013/0151441 A1* | 6/2013 | Archambeau | ............ | G06N 7/01 706/12 |

(Continued)

FOREIGN PATENT DOCUMENTS

| | | | | | |
|---|---|---|---|---|---|
| CN | 106874914 A | * | 6/2017 | ............ | B25J 9/1664 |
| CN | 110287941 A | * | 9/2019 | ......... | G06K 9/00664 |

(Continued)

OTHER PUBLICATIONS

CN-110287941-A translation (Year: 2019).*

(Continued)

*Primary Examiner* — Kyle T Johnson
(74) *Attorney, Agent, or Firm* — NORTON ROSE FULBRIGHT US LLP; Gerard A. Messina (57) ABSTRACT

A method for controlling a physical system. The method includes training a neural network to output, for a plurality of tasks, a result of the task carried out, in each case in response to the input of a control configuration of the physical system and the input of a value of a task input parameter; ascertaining a control configuration for a further task with the aid of Bayesian optimization, the neural network, parameterized by the task input parameter, being used as a model for the relationship between control configuration and result; and controlling the physical system according to the control configuration to carry out the further task.

9 Claims, 3 Drawing Sheets

(58) Field of Classification Search
CPC ............ G06N 3/045; G06N 7/01; G06N 3/08;
G06N 20/10; G06N 3/047; G05B 13/027;
G05B 13/042
See application file for complete search history.

(56) References Cited

U.S. PATENT DOCUMENTS

| | | | | |
|---|---|---|---|---|
| 2015/0066821 | A1* | 3/2015 | Nakamura | G06N 7/01 706/12 |
| 2018/0025288 | A1* | 1/2018 | Piche | G05B 13/0265 706/46 |
| 2019/0141113 | A1* | 5/2019 | Ganapathi | G06N 7/01 |
| 2019/0152054 | A1* | 5/2019 | Ishikawa | B25J 9/163 |
| 2019/0228495 | A1* | 7/2019 | Tremblay | G06N 3/045 |
| 2020/0064444 | A1* | 2/2020 | Regani | G01S 7/417 |
| 2020/0086480 | A1* | 3/2020 | Haddadin | B25J 9/1633 |
| 2020/0230815 | A1* | 7/2020 | Nikovski | G05B 19/402 |
| 2021/0065052 | A1* | 3/2021 | Muralidharan | G06N 7/01 |
| 2021/0379761 | A1* | 12/2021 | Klenske | G06F 17/18 |
| 2022/0097227 | A1* | 3/2022 | Berkenkamp | G06F 18/24155 |
| 2022/0137608 | A1* | 5/2022 | Ilin | G06F 18/214 700/97 |
| 2022/0297290 | A1* | 9/2022 | Berkenkamp | B25J 9/163 |
| 2023/0259079 | A1* | 8/2023 | Held | G05B 13/042 700/29 |

FOREIGN PATENT DOCUMENTS

| | | | |
|---|---|---|---|
| CN | 110544307 | A * | 12/2019 |
| CN | 113887214 | A * | 1/2022 |
| KR | 100834187 | B1 * | 6/2008 |

OTHER PUBLICATIONS

CN-110544307-A translation (Year: 2019).*
KR-100834187-B1 translation (Year: 2008).*
CN-113887214-A translation (Year: 2022).*
CN-106874914-A translation (Year: 2017).*
V. Perrone et al., "Scalable Hyperparameter Transfer Learning" in 32nd Conference on Neural Information Processing Systems (NeurIPS 2018), Montreal, Canada, Retrieved from the Internet on Aug. 25, 2021: https://papers.nips.cc/paper/2018/hash/14c879f3f5d8ed93a09f6090d77c2cc3-Abstract.html. 11 Pages.
Peng, Huimin: "A Comprehensive Overview and Survey of Recent Advances in Meta-Learning," arXiv:2004.11149v6, (2020), pp. 1-35; URL: https://arxiv.org/pdf/2004.11149v6.pdf.
Petit, et al.: "Developmental Bayesian Optimization of Black-Box with Visual Similarity-Based Transfer Learning," 2018 Joint IEEE 8th International Conference on Developemt and Learning and Epigenetic Robotics (ICDL-EpiRpb), (2018), Japan, pp. 161-168.

* cited by examiner

DEVICE AND METHOD FOR CONTROLLING A PHYSICAL SYSTEM

CROSS REFERENCE

The present application claims the benefit under 35 U.S.C. § 119 of German Patent Application No. DE 102020212076.5 filed on Sep. 25, 2020, which is expressly incorporated herein by reference in its entirety.

FIELD

Different exemplary embodiments relate, in general, to devices and methods for controlling a physical system.

BACKGROUND INFORMATION

During control processes, for example the control of a system for the manufacture of a product or the processing of a workpiece or the motion of a robot, the relationship between the control configuration (i.e., the values of the control parameters) and the result, given by the observable output parameter values, may be very complex. In addition, such an evaluation of control parameter values may be costly and defective. Bayesian optimization (BO) is suitable in such cases for ascertaining control parameter values since it allows unknown ("black box") functions, for which no gradient information is available, to be optimized when only noisy evaluations of the functions are possible.

To keep the number of iterations necessary for optimizing an unknown function as low as possible, a knowledge transfer of preceding optimizations of similar unknown functions (or also from other information sources which require less effort) may be used.

The paper "Scalable Hyperparameter Transfer Learning" by V. Perrone et al., in Advances in Neural Information Processing System 31 (NIPS 2018), hereafter referred to as reference [1], describes a method referred to as multi-task adaptive Bayesian linear regression (MT-ABLR). A neural network (NN) is used with this method to encode a feature space which is jointly used by all previously examined black box functions (which are related to the present task). One Bayesian linear regression (BLR) layer per task is used to learn a representation of the task, including the expected value for a given set of parameters and the uncertainty with respect to this value. By learning the shared feature space, MT-ABLR is able to transfer available knowledge from similar black box functions, and to carry out the optimization for the present task more efficiently.

SUMMARY

According to different specific embodiments of the present invention, a method for controlling a physical system is provided, which includes: training a neural network to output, for a plurality of tasks carried out by the physical system, a result of the task carried out, in each case in response to the input of a control configuration of the physical system and the input of a value of a task input parameter, the training including the ascertainment of weights of the neural network and, for each of the tasks carried out, the value of the task input parameter; ascertaining a control configuration for a further task with the aid of Bayesian optimization, successive evaluations of control configurations being carried out, during each evaluation the result of the execution of the further task being ascertained for a respective control configuration, the neural network, parameterized by the task input parameter distributed according to a probability distribution, being used as a model for the relationship between control configuration and result and, using the evaluations, being successively updated in that the probability distribution of the task input parameter is conditioned on the evaluations, and controlling the physical system according to the control configuration to carry out the further task.

Bayesian optimization is a very versatile method for optimizing functions. The strength of this method is that it is very efficient in terms of needing few function evaluations to find the optimum and being able to handle noisy function evaluations, and not requiring any gradient information. As a result, this method is suitable for a plurality of applications in which, e.g., the parameters of an experiment have to be optimized to optimize a certain variable.

The above-described approach in accordance with example embodiments of the present invention additionally enable the efficient search for an optimal control configuration since it is able to take advantage of prior knowledge from tasks similar to the task presently to be carried out (i.e., the further task). It is also possible to use further prior knowledge from less complex information sources. A similar task is, for example, during the manufacture of a workpiece, the manufacture of a similar workpiece on the same machine, the treatment of a similar object by the same robot arm in similar surroundings, a task for processing sensor data (e.g., image classification) stemming from similar sensors (e.g., from another camera type). According to different specific embodiments of the present invention, a plausible a priori distribution across the (surrogate) model functions which are representative of the task to be carried out (i.e., which approximate the target function) is learned. This probability distribution may be used for the Bayesian optimization, even if no target function evaluations (i.e., evaluations of control configurations) are available yet for the task presently to be carried out. The probability distribution across the model functions results from the parameterization of the model for the target function using the task input parameter. The task input parameter may be regarded as a latent value. Its values are vectors in an, e.g., multidimensional (e.g., 2- through 5-dimensional) latent space. The dimensionality of the latent space is determined, for example, by the number of the different training points and their complexity. The probability distribution of the task input parameters supplies a corresponding probability distribution of the model functions. This enables an efficient search for the optimum of the target function using few function evaluations.

In accordance with different specific embodiments of the present invention, a neural network is used as a surrogate model, instead of a Gaussian process, as it is usually used as a (surrogate) model during the Bayesian optimization (BO) and updated by function evaluations, in that an a posteriori Gaussian process is ascertained by conditioning an a priori Gaussian process on the function evaluations, according to different specific embodiments of the present invention. The function implemented by the neural network represents the surrogate model for the target function. It is parameterized by the task input parameter and is updated in each iteration of the Bayesian optimization by one or multiple function evaluation(s) in that the a priori distribution of the task input parameter is conditioned on the function evaluations for an a posteriori distribution. The uncertainty of the model is given by the uncertainty of the probability distribution of the task input parameter. The uncertainty is reduced by conditioning this probability distribution on the function evaluations.

Different exemplary embodiments are described hereafter.

Exemplary embodiment 1 is the above-described method for controlling a physical system.

Exemplary embodiment 2 is the method according to exemplary embodiment 1, the training of the neural network being carried out by supervised learning using a loss function which depends on the weights of the neural network and the values of the task input parameter for the tasks carried out.

The training with the aid of such a loss function enables the efficient training of the weights of the neural network, together with the values of the task input parameter for the tasks carried out. In particular, no separate training processes for the weights and the values of the task input parameter are necessary.

Exemplary embodiment 3 is the method according to exemplary embodiment 1 or 2, the loss function including a regularization term which causes the empirical distribution of the values of the task input parameter which are trained for the tasks carried out to approximate a predefined probability distribution.

The use of the regularization term prevents overfitting during the training of the values of the task input parameter.

Exemplary embodiment 4 is the method according to exemplary embodiment 3, the predefined probability distribution being a Gaussian distribution.

The use of the Gaussian distribution as a predefined probability distribution for the values of the input parameter prevents the values of the input parameter from being trained in such a way that they are situated in separate regions of the latent space.

Exemplary embodiment 5 is the method according to one of exemplary embodiments 1 through 4, the probability distribution of the task input parameter for the further task being conditioned on the evaluations in that the probabilities for task input parameter values for which the output of the neural network is closer to the results supplied by the evaluations is increased compared to probabilities for task input parameter values for which the output of the neural network is less close to the results supplied by the evaluations.

The function implemented by the neural network (parameterized by the task input parameter value) thus approaches the target function during the course of the BO process in that the probability distribution of the task input parameter values always better represents the correct task input parameter value for the further task (i.e., supplies high probabilities in its surroundings). In this way, the neural network trained by prior knowledge from the earlier tasks is always better prepared for the present task.

Exemplary embodiment 6 is the method according to one of exemplary embodiments 1 through 5, the physical system including one or multiple actuator(s), and the control of the physical system according to the control configuration for carrying out the further task including the control of the one or multiple actuator(s) according to control parameter values given by the control configuration.

The above-described approach enables, for example, a rapid adaptation of the control configuration to new tasks which are carried out by a machine or a robot, e.g., in manufacturing.

Exemplary embodiment 7 is the method according to one of exemplary embodiments 1 through 6, the control configuration including hyperparameters of a machine learning model which is implemented by the physical system.

The above-described approach is also suitable for rapidly finding hyperparameters for a machine learning model, for example for a neural network for processing sensor data.

Exemplary embodiment 8 is the method according to one of exemplary embodiments 1 through 7, the further task being an image classification of digital images or the manufacture of a product.

Exemplary embodiment 9 is a control unit which is configured to carry out the method as recited in one of exemplary embodiments 1 through 8.

Exemplary embodiment 10 is a computer program, including program instructions which, when they are executed by one or multiple processor(s), prompt the one or multiple processor(s) to carry out a method according to one of exemplary embodiments 1 through 8.

Exemplary embodiment 11 is a computer-readable memory medium on which program instructions are stored, which, when they are executed by one or multiple processor(s), prompt the one or multiple processor(s) to carry out a method according to one of exemplary embodiments 1 through 8.

Exemplary embodiments of the present invention are shown in the figures and are described in greater detail hereafter. In the figures, identical reference numerals everywhere in the multiple views in general relate to the same parts. The figures are not necessarily true to scale, the focus instead being placed in general on the illustration of the features of the present invention.

DETAILED DESCRIPTION OF EXAMPLE EMBODIMENTS

The different specific embodiments, in particular, the exemplary embodiments described hereafter, may be implemented with the aid of one or multiple circuit(s). In one specific embodiment, a "circuit" may be understood to mean any kind of logic-implementing entity, which may be hardware, software, firmware, or a combination thereof. In one specific embodiment, a "circuit" may thus be a hard-wired logic circuit or a programmable logic circuit, such as for example a programmable processor, for example a microprocessor. A "circuit" may also be software which is implemented or executed by a processor, for example any kind of computer program. Any other kind of implementation of the respective functions, which are described in greater detail hereafter, may be understood as a "circuit" in agreement with an alternative specific embodiment.

Figure 1:
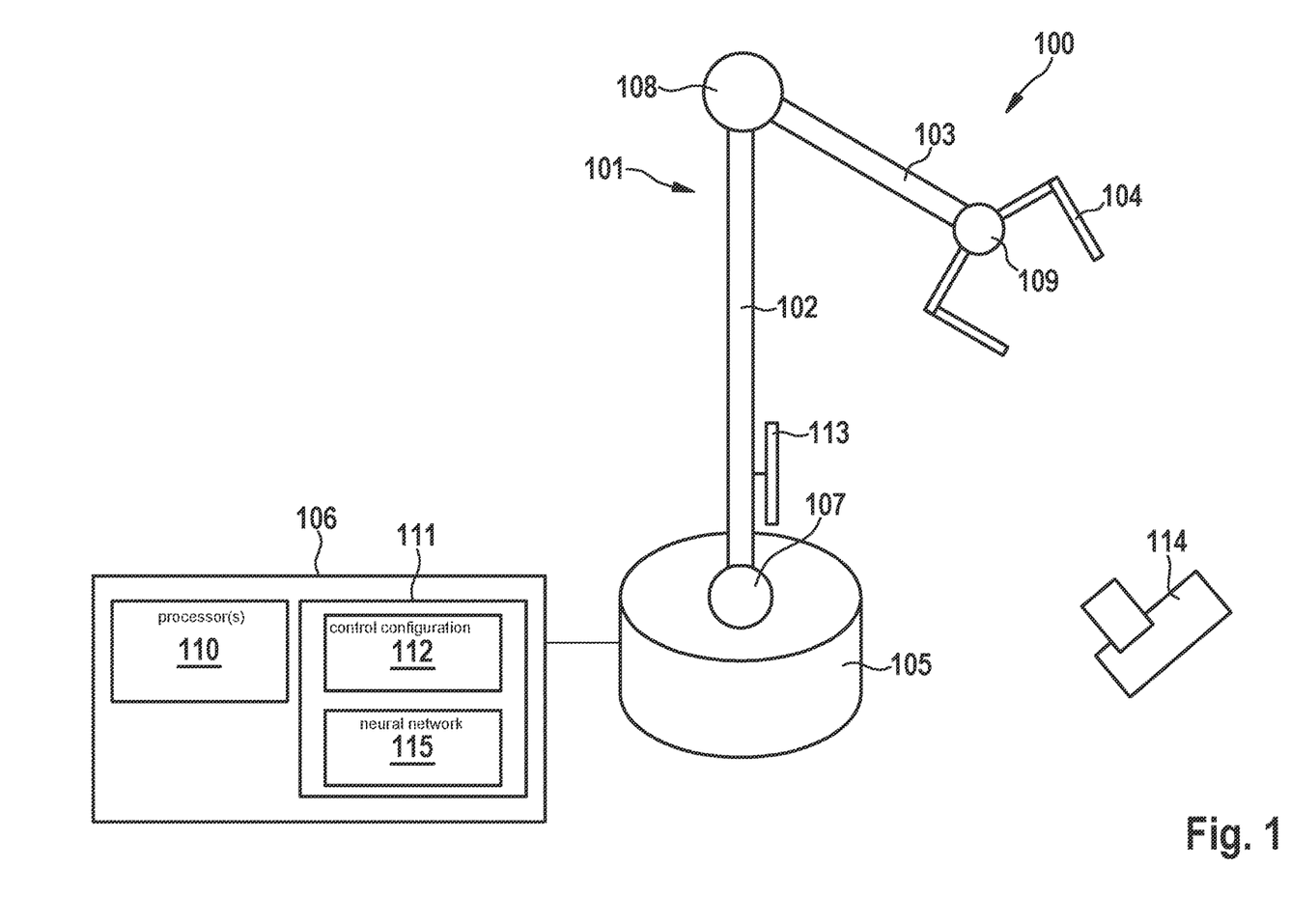
FIG. 1 shows a robot in accordance with an example embodiment of the present invention.

FIG. 1 shows a robot 100.

Robot 100 includes a robot arm 101 (in general, a robot element), for example an industrial robot arm for moving, assembling or processing a workpiece. Robot arm 101 includes robot members 102, 103, 104 and a base (or, in general, a mounting) 105, by which robot members 102, 103, 104 are supported. The term "robot member" refers to the movable parts of robot arm 101, whose actuation enables a physical interaction with the surroundings, e.g., to execute a task. For control, robot 100 includes a control unit 106, which is configured to implement an interaction with the surroundings according to a control program. The last element 104 (as viewed from base 105) of robot members 102, 103, 104 is also referred to as an end effector 104 and may include one or multiple tool(s), such as a welding torch, a gripper tool, a painting system or the like.

The other robot members 102, 103 (closer to base 105) may form a positioning device so that, together with end effector 104, a robot arm (or articulated arm) including end effector 104 at its end is provided. Robot arm 101 is a mechanical arm which is able to carry out activities similar to those of a human arm (possibly using a tool at its end).

Robot arm 101 may include connecting elements 107, 108, 109, which connect robot members 102, 103, 104 to one another and to base 105. A connecting element 107, 108, 109 may include one or multiple joint(s), of which each may provide a rotary motion and/or a translatory motion (i.e., a displacement) for associated robot members relative to one another. The motion of robot members 102, 103, 104 may be introduced with the aid of actuators, which are controlled by control unit 106.

The term "actuator" may be understood to mean a component which is suitable to influence a mechanism in response to being driven. The actuator may convert instructions output by control unit 106 (the so-called activation) into mechanical motions. The actuator, e.g., an electromechanical transducer, may be configured to convert electrical energy into mechanical energy in response to its activation.

The term "control unit" (also referred to as "controller") may be understood to mean any type of logic implementation unit which, for example, may include a circuit and/or a processor, which is able to execute software, firmware or a combination thereof stored in a memory medium, and which is able to issue instructions, e.g., to an actuator in the present example. The control unit may, for example, be configured by program code (e.g., software) to control the operation of a system, in the present example of a robot.

In the present example, control unit 106 includes one or multiple processor(s) 110 and a memory 111, which stores code and data based on which processor 110 controls robot arm 101. According to different specific embodiments, control unit 106 controls robot arm 101 based on a control configuration 112 stored in memory 111.

It should be noted that the configuration of robot 100 with a robot arm is only one example, and the robot may be configured in the form of any machine in which mechanical elements are controllable (including valves or other movable parts).

Control configuration 112 is a set of values for control parameters which influence the control behavior, to weigh, e.g., manufacturing speed and wear of the machine against one another.

One example of a machine including control parameters is a manufacturing machine, such as for example a milling machine, a lathe, a deep hole drill, in which control unit 106 sets, e.g., the feed rate for a deep hole drive, the rotational speed of a milling head, etc., as a function of the instantaneous state of the machine (and/or of the time).

Since the relationship between control configuration and result is complex and difficult to predict, i.e., is given by an unknown "black box function," control unit 106 determines the control configuration with the aid of Bayesian optimization.

According to different specific embodiments, control unit 106 uses prior knowledge in the process to reduce the iterations necessary for the optimization during the Bayesian optimization. Exemplary embodiments may, for example, be used for the optimization of different industrial processes.

When a machine is used, for example, to manufacture a plurality of parts, the control parameters of the machine must be coordinated for every single part before it may be series-manufactured. The use of prior knowledge from previously carried out tasks and optimization of the machine setting therefor allows an efficient optimization for the manufacture of a new part. This allows, in particular, the development costs to be reduced.

Another application of different specific embodiments is the hyperparameter fine adjustment (tuning) for methods and models for machine learning (ML). When an ML model is applied to a physical process or a physical system, there are typically many parameters whose values have to be specifically adapted to the particular task, i.e., in this application specifically to the data set. In the case of a neural network, these parameters are so-called hyperparameters, such as for example the number of layers, the number of neurons per layer, activation functions, learning rate, etc. To find the optimal values, the training process of the neural network has to be repeated for each set of hyperparameters, which requires a considerable amount of computing power. The exemplary embodiments described hereafter allow a control unit to rapidly identify hyperparameters for a task by utilizing the prior knowledge from the optimization of the hyperparameters for similar tasks.

Exemplary embodiments are thus not limited to just a control of a robot arm 101 or a machine, but may be used, in general, for setting control configurations (i.e., control parameter values), such as for example for setting the hyperparameters of an ML model which is used in a physical system, e.g., an ML model for image classification, e.g., used in a vehicle for the detection of objects in the surroundings of the vehicle.

In particular, control unit 106 may not only operate actuators to set the position in the space of an element (such as for example of end effector 104), but may, in general, carry out a control to set (for example by setting controlled elements, such as a valve, or also a power supply) process parameters during a manufacturing process or processing operation, such as for example process temperature, process time, a vacuum or a gas atmosphere, etc., in such a way that desired properties, such as for example hardness, strength, thermal conductivity, electrical conductivity, etc., of a workpiece are obtained. As explained above, control unit 106 may also set hyperparameters of an ML model for a certain task, for example for an image classification.

In such a control scenario of a physical system, such as for example a robot, a machine, a manufacturing or processing system or a vehicle, the output parameters are typically noisy. This means that, even though output parameter values (such as a reached position of a manipulated object or the achieved property of a workpiece, or also the accuracy of an image classification) depend on the control parameter values which, in turn, result in certain process parameters, they also vary, even if the control parameter values are the same.

To obtain desired output parameter values, control parameter values are to be determined in such a way that a target function which depends on the output parameters is optimized. For example, an object 114 to be moved is to be moved as close to the target as possible, a certain temperature is to be set as precisely as possible, or the hardness of a product is to be as close to a target value as possible.

Since the output parameter values are noisy and the target function depends on the output parameter values, the target function is also noisy. In addition, the target function is typically unknown since it represents a complex relationship of control parameter values and output parameters (on which its value depends).

In the example of FIG. 1, control unit 106 may receive sensor data from one or multiple sensor(s) 113 (in the example of a robot, e.g., a camera, in the case of other applications, e.g., also temperature sensors, current sensors, etc.) to obtain information about the output parameter values for certain control parameter values, i.e., to evaluate the target function. Sensors 113 may, for example, also be part of robot arm 101.

According to different specific embodiments, a control unit 106 ascertains values for control parameters for optimizing a physical or chemical process (i.e., corresponding to a given target function, as described above) to solve a present task (i.e., a task presently to be carried out), using Bayesian optimization.

Bayesian optimization may be used when an unknown function f (a so-called "black box" function, such as the target function in the above examples) is to be optimized (minimized or maximized). This unknown function f is a function which may only be evaluated or measured for one value x and be observed (possibly subject to noise). The observed value y results as $y=f(x)+\varepsilon$, $\varepsilon$ denoting the noise component. In addition, it is assumed that each evaluation (measurement) of the unknown function f is expensive, i.e., results in costs, in terms of the evaluation of the unknown function resulting in a high complexity, as is the case, e.g., when an experiment is executed on a test bench. Due to the expensive evaluation of the unknown function, it is desirable that only few evaluations have to be carried out during the optimization.

For the Bayesian optimization of an unknown function f, function f is modeled by a surrogate model. The BO process includes the initialization of the surrogate model based on the available pieces of information (e.g., existing evaluations of function f) and the subsequent execution of multiple iterations, each iteration including:

(1) calculating the next control parameter set $x_i$ which is to be evaluated, by optimizing an acquisition function based on the surrogate model;
(2) evaluating function f for control parameter set $x_i$ by $y_i=f(x_i)$; and
(3) updating the surrogate model with the pair $[x_i, y_i]$.

The iterative process is carried out until at least one final criterion has been reached, e.g., the number of iterations or the desired result was achieved (e.g., with respect to the quality of a manufactured product or accuracy of an image classification).

Under certain prior assumptions, such as for example the steadiness of the unknown function, a statistical model may be used as the surrogate model. Typically, a Gaussian process is used as the statistical model, i.e., a Gaussian process regression is carried out for evaluation points $(x_1, \ldots, x_n)$, and evaluations are carried out at the evaluation points, i.e., the observation of the corresponding function values $(y_1, \ldots, y_n)$ at the evaluation points.

To use prior knowledge from the optimization of preceding tasks, according to different specific embodiments, however, a neural network 115 is used instead of a Gaussian process as the surrogate model, which is implemented (and trained) by control unit 106, for example. A representation of neural network 115 is stored in memory 111, for example.

According to different specific embodiments, a neural model is used as the surrogate model, which receives, as input, (at least) the set of control parameters (i.e., the variables of the function to be optimized), and a vector (also referred to as latent space vector), which indicates a representation of the present task in a latent space. The latent space vector is the value of a task parameter for the present task.

Any information which is known about the present task may be supplied to the neural network as further input. The output of the neural network is the function value for the supplied set of control parameter values (i.e., for example, costs, benefits or accuracy for the supplied set of control parameter values) as well as, according to one specific embodiment, the variance of the function value.

By inferring a suitable latent space vector for the present task, the surrogate model is rapidly adapted to the present task during the course of the BO procedure, so that the neural network (using the suitable latent space vector) effectively models the target function, by which the Bayesian optimization progresses rapidly in the direction of the optimum of the target function.

Instead of an individual BLR layer for each task as in reference [1], according to different specific embodiments, using the latent space vector, a latent representation is used for the task as input of the neural network. The value of this latent space vector is specific for each task and effectively changes the properties of the features encoded by the neural network.

Figure 2:
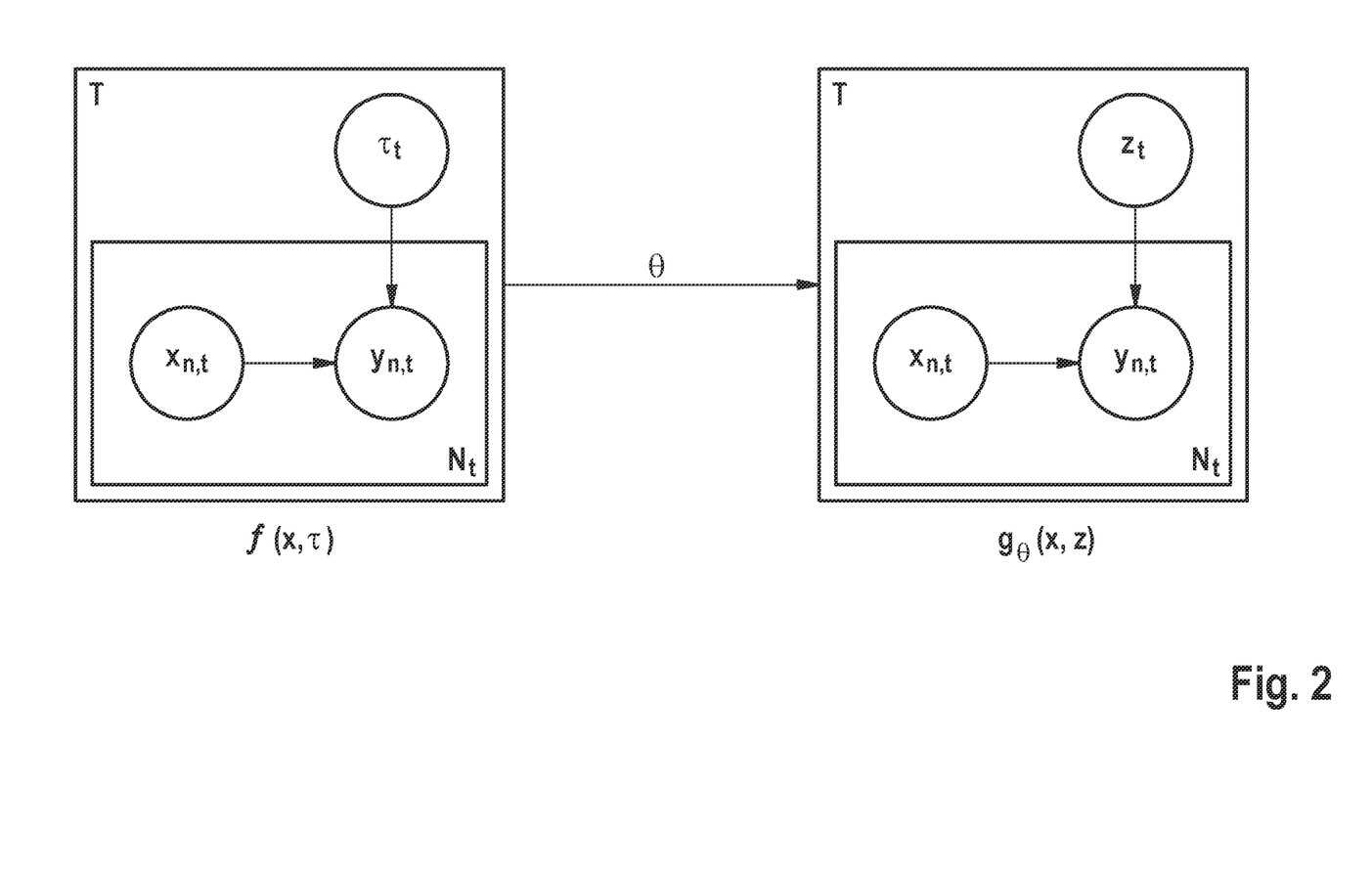
FIG. 2 illustrates the modeling of a target function with the aid of a neural network, in accordance with an example embodiment of the present invention.

FIG. 2 illustrates the modeling of a target function with the aid of a neural network.

The target function for a present task, i.e., a task to be carried out, is an unknown function $f(x,\tau)$ whose function value is a result of the task carried out (e.g., benefit, accuracy, costs, quality) which is to be optimized. In the process, x is the set of control parameters, and $\tau \in T$ is a task-specific parameter. The unknown target function is modeled by a neural network. The function implemented by the neural network is referred to as $g\theta(x,z)$, z being the latent space vector, and $\theta$ denoting the set of trainable parameters (i.e., the weights) of the neural network.

$f(x,\tau)$ and $g\theta(x,z)$ supply a function value $y_{n,t}$ for the t-th task and a set of control parameter values $x_{n,t}$ (i.e., the control configuration for the n-th function evaluation). $N_t$ denotes the number of function evaluations for the t-th task, i.e., $t=1, \ldots N_t$).

The set of parameters $\theta$ is identical for all tasks (i.e., the present task and the previously carried out tasks). Vector z may be regarded as an encoding of parameter $\tau$. Since parameter $\tau$ and its probability distribution are unknown, it is not possible to calculate z directly from $\tau$ for the present task. Instead, an a priori distribution of latent space $p(\mathcal{Z})$ is used (where $z \in \mathcal{Z}$), so that the neural network may be regarded as a generative network having latent space $\mathcal{Z}$. For example, a Gaussian a priori distribution $p(\mathcal{Z})=\mathcal{N}(0,I)$ is used.

To ascertain a control configuration for a task to be newly carried out (e.g., by a machine), control unit 106 (e.g., processor 110) initially carries out a pretraining of neural network 115, using the existing information. The goal of the pretraining is to ascertain suitable global parameters $\theta$ (i.e., weights of neural network 115), so that a corresponding latent encoding $z \in \mathcal{Z} \subseteq \mathbb{R}^d$ is present for each task $\tau \in \mathcal{T}$ so that $f(x,\tau)=g_\theta(x,z)$.

Since no information is available about $\tau$, a dedicated embedding $z_t$ is learned during the training for each task (using parameter $\tau_t$). Embeddings $z_t$ (i.e., the latent space vectors for the different tasks) are learned together with parameters θ. The training takes place with the aid of cross-validation or a statistical training test division of the training data set as a function of the size of the training data set.

Training data set D={$[x_{n,t}, y_{n,t}]_{1 \leq n \leq N_t, 1 \leq t \leq T}$} includes, for example, for each carried out (preceding) t-th task $1 \leq t \leq T$, a number of $N_t$ evaluations. The task presently to be carried out shall be the T+1-th task, i.e., a further task in addition to the T tasks already carried out. For example, the t-th task is to manufacture a t-th component and $y_{n,t}$ indicates the quality of the t-th component when using the n-th control configuration $x_{n,t}$ for the manufacturing machine for the t-th component. As a result of the training using this data set (and thus the learning of el), an internal representation of the shared features of the manufacture of the components is learned by the neural network.

The training of the neural network takes place in that the weights are learned in such a way that the log likelihood $$\mathcal{L}(x_{n,t}, y_{n,t}; \theta, z_t) = \log p_\epsilon(y_{n,t} | g_\theta(x_{n,t}, z_t))$$

(on average across the training data) becomes as great as possible, i.e., with the goal $$\min_{\theta, z_1, \ldots, z_T} \sum_{t=1}^{T} \frac{1}{N_t} \sum_{(x,y) \in \mathcal{D}_t} -\mathcal{L}(x, y; \theta, z_t) + \lambda \mathcal{R}(\{z_1, \ldots, z_T\} \| p(\mathcal{Z}))$$

where $$\mathcal{D}_t = [x_{n,t}, y_{n,t}]_{1 \leq n \leq N_t}$$

$p_\epsilon$ being the probability distribution, which results from the probability distribution of noise component ε during the function evaluation (e.g., Gaussian-distributed noise) and $\mathcal{R}$ being a regularization system, given by:

$$\mathcal{R}(\{z_1, \ldots, z_T\} \| p(\mathcal{Z})) = \sum_{i=1}^{d} (F([z_t]_i) - \Phi([z_t]_i))^2 + \lambda_c \| I - \text{Cov}(\{z_1, \ldots, z_T\}) \|_F^2.$$

The first term of $\mathcal{R}$ ensures that the empirical cumulative probability distribution function F of latent space vectors $z_1$, . . . , $z_T$ is close to the cumulative probability distribution function Φ of the d-dimensional Gaussian distribution. The cumulative probability distribution function is given by $$F(z, d) = \frac{1}{T} \sum_{t=1}^{T} \mathbb{1}([z_t]_d \leq z).$$

The second term of $\mathcal{R}$ ensures that the empirical covariance matrix is close to the identity, i.e., illustrates that the components of different dimensions of the latent space vectors are not (or at least little) correlated with one another.

The regularization term thus ensures that the probability distribution of latent space vectors $z_1$, . . . , $z_T$ follows Gaussian a priori distribution $p(\mathcal{Z}) = \mathcal{N}(0, I)$ which control unit 106 uses, as explained hereafter, for the inference of embedding $z_{T+1}$ for the task presently to be carried out.

When control unit 106 has trained neural network 115 with the aid of the training data, the control unit may use the neural network to make predictions about the task presently to be carried out. In particular, after (noisy) evaluations of the target function of the task presently to be carried out, i.e., using data $\mathcal{D}_{T+1} = \{[x_{n,T+1}, y_{n,T+1}]_{1 \leq n \leq N_{T+1}}\}$ the control unit may ascertain an a posteriori distribution for embedding $p(z_{T+1} | \mathcal{D}_{T+1}, \theta)$ (proceeding from the a priori probability distribution $p(\mathcal{Z}) = \mathcal{N}(0, I)$), e.g., with the aid of a Markov chain Monte Carlo (MCMC) method, such as for example Hamiltonian Monte Carlo (HMC), i.e., an MCMC method using Hamiltonian dynamics.

In the process, control unit 106 is illustrated to test values for $z_{T+1}$ and to retain those values for which $g_\theta(., z_{T+1})$ for evaluation points $x_{n,T+1}$ supplies function values close to $y_{n,T+1}$. The control unit receives the evaluations of target function $y_{n,T+1}$ from sensor data supplied by sensors 113, for example.

From the ascertained a posteriori distribution, control unit 106 then ascertains an a posteriori distribution of the function values of the target function of the task presently to be carried out for a control configuration x with the aid of a Monte Carlo approach according to $$p(g_\theta(x) | \mathcal{D}_{+1}, x, \theta) = \int g_\theta(x, z) p(z | \mathcal{D}_{+1}, \theta) \partial z = \mathbb{E}_{z \sim p(z | \mathcal{D}_{T+1}, \theta)}[g_\theta(x, z)]$$

With this, $g_\theta$ is conditioned on the evaluations of the task presently to be carried out, i.e., the surrogate model which is given by neural network 115 is updated with the aid of the evaluations. The mean value of the probability distribution from the above formula may be taken as an estimation for the target function, and statistical variables such as variance may be used, depending on the acquisition function used.

For example, in a first iteration of the BO process, when no evaluations are available yet for the task presently to be carried out, the control unit may use $g_\theta$, as it results from the above formula for $z \sim \mathcal{N}(0, I)$, and in later iterations of the BO process, when evaluation data $\mathcal{D}_{T+1}$ are available, it uses $g_\theta$, as it results from the above formula for $z \sim p(z | \mathcal{D}_{+1}, \theta)$.

In this way, control unit 106 may carry out the BO process for the ascertainment of a control configuration for the task presently to be carried out, using neural network 115, as the surrogate model.

Figure 3:
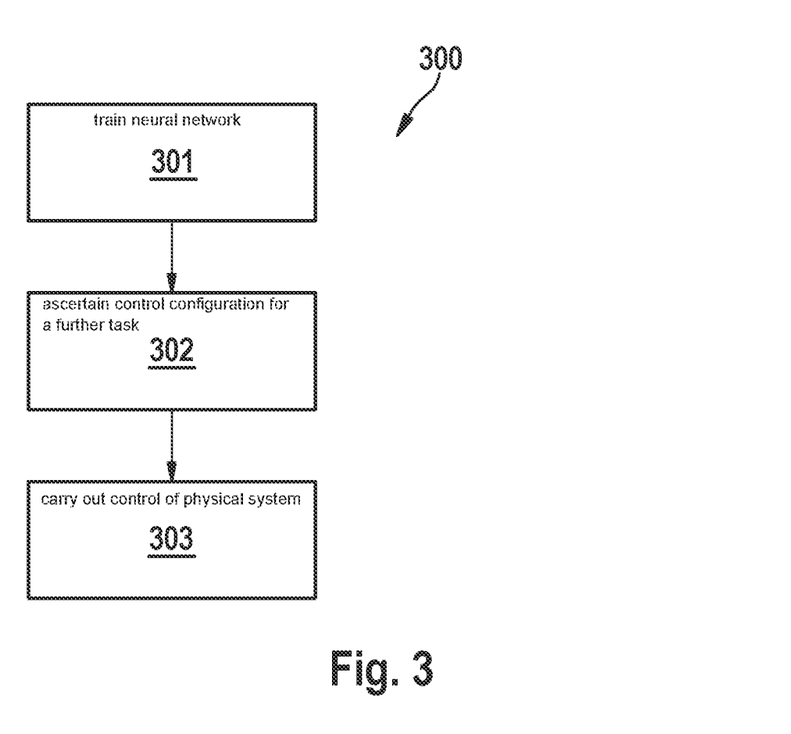
FIG. 3 shows a flowchart which illustrates a method for controlling a physical system according to one specific example embodiment of the present invention.

In summary, a method is provided according to different specific embodiments, as it is shown in FIG. 3.

FIG. 3 shows a flowchart which illustrates a method for controlling a physical system.

The method includes:

In 301, the training of a neural network to output, for a plurality of tasks carried out by the physical system, a result of the task carried out, in each case in response to the input of a control configuration of the physical system and the input of a value of a task input parameter, the training including the ascertainment of weights of the neural network and, for each of the tasks carried out, the value of the task input parameter;

in 302, the ascertainment of a control configuration for a further task with the aid of Bayesian optimization, successive evaluations of control configurations being carried out, during each evaluation the result of the execution of the further task being ascertained for a respective control configuration, the neural network, parameterized by the task input parameter distributed according to a probability distribution, being used as a model for the relationship between control configuration and result and, using the evaluations, being successively updated in that the probability distribution of the task input parameter is conditioned on the evaluations; and in 303, the control of the physical system according to the control configuration to carry out the further task.

According to one specific embodiment, one or multiple performance measuring value(s) is/are ascertained from a physical system (e.g., a manufacturing machine) or from the training method of an ML model, and these measuring values are used to coordinate control parameter values of the physical system or of the ML model, and then provide an optimal parameter set for the machine or the ML model.

For this purpose, available data from earlier optimizations for tasks similar to the task to be carried out (and possibly additional data from more cost-effective information sources) are utilized to train a general model, which may then be used to more efficiently optimize the control parameter values for the target task.

The value of the task input parameter for a task represents the task. It may therefore also be regarded as a task representation parameter.

The a priori surrogate model (prior to an evaluation) is given by the neural network using an a priori distribution across the values of the task input parameter. The a posteriori model (after one or multiple evaluation(s)) is given by the neural network using an a posteriori distribution across the values of the task input parameter which arises from the conditioning on the evaluations. One or multiple function evaluation(s) is/are ascertained for the conditioning, and it is ascertained for which task input parameter values the neural network better approximates the function evaluations. The distribution of the task input parameters is adapted (to the a posteriori distribution), for example, in such a way that the probability for such task input parameter values is increased, and is decreased for the other task input parameter values for which the neural network more poorly approximates the evaluations.

A "physical system" may be understood to mean different devices and systems, such as a robot, a computer-controlled machine, a vehicle, a household appliance, a power tool, a manufacturing machine, a personal assistant, or an access control system.

The neural network may have different architectures and may, for example, include fully connected layers and/or convolutional layers.

Different specific embodiments may receive and use sensor signals from different sensors such as video, radar, LIDAR, ultrasound, motion, acoustics, thermal image, etc., to obtain, e.g., sensor data for the evaluation of a target function. The sensor data may be processed for this purpose. This may include a classification of the sensor data or the execution of a semantic segmentation of the sensor data, e.g., to detect the presence of objects (in the surroundings in which the sensor data were obtained). Specific embodiments may be used to configure a machine learning system and, e.g., to control a robot, to carry out different manipulation tasks in different scenarios. In particular, specific embodiments may be used for controlling the execution of manipulation tasks, e.g., in assembly lines.

The method is computer-implemented according to one specific embodiment.

Even though the present invention was primarily shown and described with reference to certain specific embodiments, it should be understood by those familiar with the technical field that numerous modifications with respect to the configuration and details thereof may be carried out, without departing from the essence and the field of the present invention.

What is claimed is:

1. A method for controlling a physical system, comprising the following steps:
    training a neural network to output, for a plurality of tasks carried out by the physical system, a result of the task carried out, in each case in response to input of a control configuration of the physical system and input of a value of a task input parameter, the training including the ascertaining of weights of the neural network and, for each of the tasks carried out, the value of the task input parameter;
    ascertaining a control configuration for a further task using Bayesian optimization, successive evaluations of control configurations being carried out, during each of the evaluations, a result of an execution of the further task being ascertained for a respective control configuration, the neural network, parameterized by the task input parameter distributed according to a probability distribution, being used as a model for a relationship between control configuration and result and, using the evaluations, being successively updated in that the probability distribution of the task input parameter is conditioned on the evaluations; and
    controlling the physical system according to the control configuration to carry out the further task, wherein the probability distribution of the task input parameter for the further task is conditioned on the evaluations in that probabilities for task input parameter values for which an output of the neural network is closer to results supplied by the evaluations is increased compared to probabilities for task input parameter values for which the output of the neural network is less close to the results supplied by the evaluations.

2. The method as recited in claim 1, wherein the training of the neural network is carried out by supervised learning using a loss function which depends on the weights of the neural network and the values of the task input parameter for the tasks carried out.

3. The method as recited in claim 2, wherein the loss function includes a regularization term which causes an empirical distribution of the values of the task input parameter which are trained for the tasks carried out to approximate a predefined probability distribution.

4. The method as recited in claim 3, wherein the predefined probability distribution is a Gaussian distribution.

5. The method as recited in claim 1, wherein the physical system includes one or multiple actuators, and the control of the physical system according to the control configuration for carrying out the further task includes control of the one or multiple actuators according to control parameter values given by the control configuration.

6. The method as recited in claim 1, wherein the control configuration includes hyperparameters of a machine learning model which is implemented by the physical system.

7. The method as recited in claim 1, wherein the further task is an image classification of digital images or a manufacture of a product.

8. A control unit configured to control a physical system, the control unit configured to:
    train a neural network to output, for a plurality of tasks carried out by the physical system, a result of the task carried out, in each case in response to input of a control configuration of the physical system and input of a value of a task input parameter, the training including the ascertaining of weights of the neural network and, for each of the tasks carried out, the value of the task input parameter;

ascertain a control configuration for a further task using Bayesian optimization, successive evaluations of control configurations being carried out, during each of the evaluations, a result of an execution of the further task being ascertained for a respective control configuration, the neural network, parameterized by the task input parameter distributed according to a probability distribution, being used as a model for a relationship between control configuration and result and, using the evaluations, being successively updated in that the probability distribution of the task input parameter is conditioned on the evaluations; and control the physical system according to the control configuration to carry out the further task, wherein the probability distribution of the task input parameter for the further task is conditioned on the evaluations in that probabilities for task input parameter values for which an output of the neural network is closer to results supplied by the evaluations is increased compared to probabilities for task input parameter values for which the output of the neural network is less close to the results supplied by the evaluations.

9. A non-transitory computer-readable memory medium on which are stored program instructions for controlling a physical system, the program instructions, when executed by one or more processors, causing the one or more processors to perform the following steps:

training a neural network to output, for a plurality of tasks carried out by the physical system, a result of the task carried out, in each case in response to input of a control configuration of the physical system and input of a value of a task input parameter, the training including the ascertaining of weights of the neural network and, for each of the tasks carried out, the value of the task input parameter;

ascertaining a control configuration for a further task using Bayesian optimization, successive evaluations of control configurations being carried out, during each of the evaluations, a result of an execution of the further task being ascertained for a respective control configuration, the neural network, parameterized by the task input parameter distributed according to a probability distribution, being used as a model for a relationship between control configuration and result and, using the evaluations, being successively updated in that the probability distribution of the task input parameter is conditioned on the evaluations; and controlling the physical system according to the control configuration to carry out the further task, wherein the probability distribution of the task input parameter for the further task is conditioned on the evaluations in that probabilities for task input parameter values for which an output of the neural network is closer to results supplied by the evaluations is increased compared to probabilities for task input parameter values for which the output of the neural network is less close to the results supplied by the evaluations.

\* \* \* \* \*